(12) United States Patent
Jahankhani et al.

(10) Patent No.: US 11,194,850 B2
(45) Date of Patent: Dec. 7, 2021

(54) NATURAL LANGUAGE QUERY SYSTEM

(71) Applicant: BUSINESS OBJECTS SOFTWARE LTD., Dublin (IE)

(72) Inventors: Saeed Jahankhani, Vancouver (CA); Alexander MacAulay, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 77 days.

(21) Appl. No.: 16/221,114

(22) Filed: Dec. 14, 2018

(65) Prior Publication Data

US 2020/0192924 A1 Jun. 18, 2020

(51) Int. Cl.
*G06F 16/33* (2019.01)
*G06F 40/211* (2020.01)
*G06F 40/242* (2020.01)
*G06F 40/289* (2020.01)
*G06F 16/2453* (2019.01)

(52) U.S. Cl.
CPC .... *G06F 16/3344* (2019.01); *G06F 16/24534* (2019.01); *G06F 16/3332* (2019.01); *G06F 16/3334* (2019.01); *G06F 16/3338* (2019.01); *G06F 40/211* (2020.01); *G06F 40/242* (2020.01); *G06F 40/289* (2020.01)

(58) Field of Classification Search
CPC ............. G06F 16/3338; G06F 16/3344; G06F 16/24534; G06F 16/3332
See application file for complete search history.

(56) References Cited

U.S. PATENT DOCUMENTS

| | | | |
|---|---|---|---|
| 8,661,012 B1 * | 2/2014 | Baker | G06F 16/3338 707/706 |
| 2007/0088734 A1 * | 4/2007 | Krishnamurthy | G06F 40/169 |
| 2007/0203894 A1 * | 8/2007 | Jones | G06F 16/3332 |
| 2008/0046405 A1 * | 2/2008 | Olds | G06F 16/3322 |
| 2008/0104056 A1 * | 5/2008 | Li | G06Q 10/063 |
| 2016/0371395 A1 * | 12/2016 | Dumant | G06F 16/24575 |
| 2016/0373456 A1 * | 12/2016 | Vermeulen | G06F 16/245 |

* cited by examiner

*Primary Examiner* — Samuel G Neway
(74) *Attorney, Agent, or Firm* — Buckley, Maschoff & Talwalkar LLC

(57) ABSTRACT

A system includes reception of an input string of words, determination, for each subset of consecutive one or more words in the input string, of one or more phrase types based on the subset, on a dictionary describing a plurality of entities, each of the plurality of entities associated with an entity type, and on a grammar describing a plurality of phrase types, each of the plurality of phrase types associated with one or more conditions, and determination of a plurality of candidate queries based on the determined phrase types.

17 Claims, 10 Drawing Sheets

| What | Is | Sales | for | North | America |
|---|---|---|---|---|---|
| (1,1) | (1,2) | (1,3) | (1,4) | (1,5) | (1,6) |

*FIG. 4*

| What | Is | Sales | for | North | America |
|---|---|---|---|---|---|
| (1,1) | (1,2) | (1,3) | (1,4) | (1,5) | (1,6) |
| (2,1) | (2,2) | (2,3) | (2,4) | (2,5) | |

*FIG. 5*

| What | Is | Sales | for | North | America |
|---|---|---|---|---|---|
| (1,1) | (1,2) | (1,3) | (1,4) | (1,5) | (1,6) |
| (2,1) | (2,2) | (2,3) | (2,4) | (2,5) | |
| (3,1) | (3,2) | (3,3) | (3,4) | | |
| (4,1) | (4,2) | (4,3) | | | |
| (5,1) | (5,2) | | | | |
| (6,1) | | | | | |

| Name | Rank | "show how income offset sales" | "by producer" | "for provinces of statistics and ontario" | "2h 2017" | Expanded |
|---|---|---|---|---|---|---|
| desired | 1 | I A(1,5) | D(6,2) | FM(8,6) | TP(14,2) | I M M M A D M T P |
| low as ordering | 2 | I H A(2,4) | D(6,2) | FM(8,6) | TP(14,2) | I H M M A D M T P |
| missed intent | >10 | A(1,5) | D(6,2) | FM(8,6) | TP(14,2) | M M M M A D M T P |
| for province as dim | >10 | I H A(2,4) | D(6,2) | D(8,2)(O) M(11,3) | TP(14,2) | I M M M A D D M T P |

NATURAL LANGUAGE QUERY SYSTEM

BACKGROUND

Enterprise software systems receive, generate, and store data related to many aspects of an enterprise. Users operate reporting tools to view and analyze such data. For example, a reporting tool may be used to submit a query to a system storing enterprise data. The system, which may be on-premise, cloud-based, or otherwise deployed, generates a result set based on the query and on the stored data, and returns the result set to the reporting tool for display and/or analysis.

In order to shield an end-user from the complexities of an underlying data storage schema, conventional systems associate intuitively-named logical objects with one or more physical entities (e.g., a physical database table, associated columns of one or more database tables) of the underlying data source. These objects may be classified as dimensions, along which one may want to perform an analysis or report (e.g., Year, Country, Product), or measures (e.g., Sales, Profit), whose values can be determined for a given combination of dimension members. For example, an end-user may operate a reporting tool to submit the query "Sales by Country".

An end-user is therefore required to possess some familiarity with the defined logical objects and with a corresponding query syntax. As the complexity of the desired result set increases, the formulation of an appropriate query may quickly overwhelm the end-user. Time and resources are inefficiently expended while attempting to formulate an appropriate query, and during subsequent refinement of the query during trial-and-error iterations. Systems are desired to support the understanding and servicing of queries which might not conform to a defined query syntax.

BRIEF DESCRIPTION OF THE DRAWINGS

FIG. 4 illustrates the determination of entity matches according to some embodiments.

FIG. 5 illustrates the determination of phrase matches according to some embodiments.

FIG. 6 illustrates the determination of phrase matches according to some embodiments.

FIG. 7 illustrates the determination of phrase matches according to some embodiments.

FIG. 8 illustrates the determination of candidate queries according to some embodiments.

FIG. 9 illustrates a subset of candidate queries according to some embodiments.

FIG. 10 illustrates considerations for scoring candidate queries according to some embodiments.

DETAILED DESCRIPTION

The following description is provided to enable any person in the art to make and use the described embodiments. Various modifications, however, will remain readily apparent to those in the art.

Generally, some embodiments determine a plurality of candidate queries based on a text string input by an end-user. According to some embodiments, the input text string may or may not conform to a query syntax, and may be written in natural language form. By virtue of operation, the number of candidate queries may be significantly less than those provided by conventional systems, and therefore more easily evaluated against one another. One or more of the candidate queries (e.g., a highest-scoring candidate query) may be presented to a data source in order to access a result set desired by the end-user.

Figure 1:
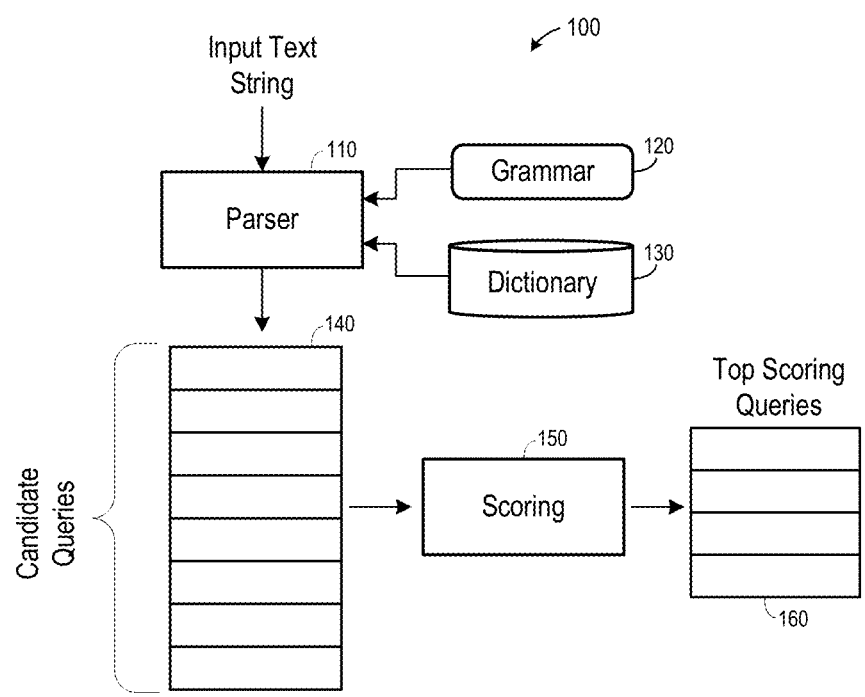
FIG. 1 is a block diagram of a system architecture according to some embodiments.

FIG. 1 illustrates architecture 100 according to some embodiments. Architecture 100 includes parser 110, which receives an input text string and uses grammar 120 and dictionary 130 to determine a list of candidate queries 140 based on the input text string. Scoring component 150 determines a score for each of candidate queries 140, and top scoring queries 160 is a subset of the highest-scoring ones of candidate queries 140.

As will be described in detail below, parser 110 may operate to match each word of the input text string with zero or more entities defined in dictionary 130. Such entities may include keywords, dimension names, dimension member names, measure names, logical operators, etc. Parser 110 may further operate to determine phrases within the text string based on the entity matches associated with each word and based on grammar 120. Parser 110 may also determine larger phrases from smaller identified phrases based on the identified entities and grammar 120. In this regard, grammar 120 may define ways in which identified entities or phrases may be combined within a valid query.

Due to the operation of parser 110, the number of candidate queries 140 may be significantly less than other systems. Each of candidate queries 140 may be scored by scoring component 150 based on one or more scoring features which will be described below. Top scoring queries 160 are then determined from candidate queries 140 based on a minimum score threshold and/or a threshold number of queries to be returned to the user.

Each element of architecture 100 may be may be implemented at least in part in computer hardware, in program code and/or in one or more computing systems executing such program code as is known in the art. Such a computing system may include one or more processing units which execute processor-executable program code stored in a memory system.

Figure 2:
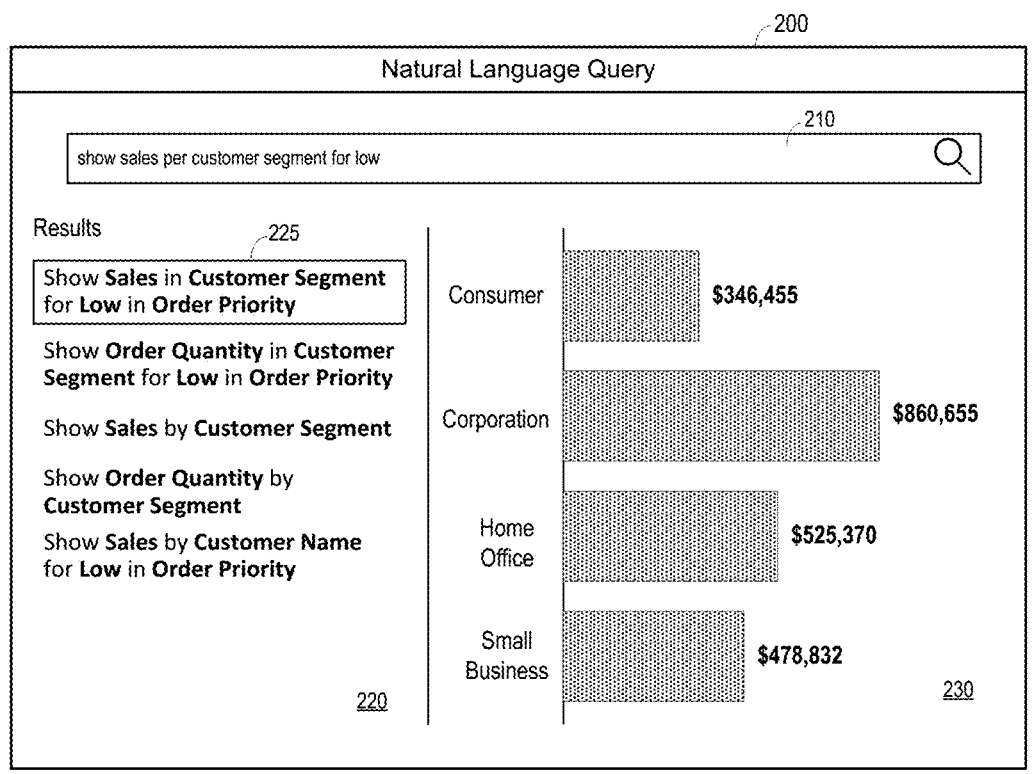
FIG. 2 is a view of a user interface to receive an input string and to display candidate queries and visualizations according to some embodiments.

FIG. 2 illustrates interface 200 according to some embodiments. Interface 200 may be presented on a display of a computing system executing a data reporting tool client according to some embodiments. Such a data reporting tool client may allow the input of queries via selection of dimensions, measures and filters as is known in the art, as well as the input of "natural language" queries via an interface such as interface 200. Embodiments are not limited to interface 200.

Interface 200 includes input field 210. An end-user may input a text string into field 210 using a keyboard or other input device. The text string is intended to retrieve desired data which is stored in a data source. In the present example, the end-user has input the text string "show sales per customer segment for low".

Interface 220 includes query area 220 displaying candidate queries generated based on the input text string according to some embodiments. The candidate queries displayed in area 220 may comprise the top-scoring ones of a larger set of candidate queries determined based on the input text string.

Query 225 of area 220 is selected and, accordingly, visualization area 230 displays a visualization of a result set corresponding to query 225. Selection of query 225 may cause transmission of query 225 to a query server and return of a corresponding result set from the query server as is known in the art. Query 225 may be initially selected upon presentation of the candidate queries in area 220, rather than by an affirmative selection by the end-user.

Figure 3:
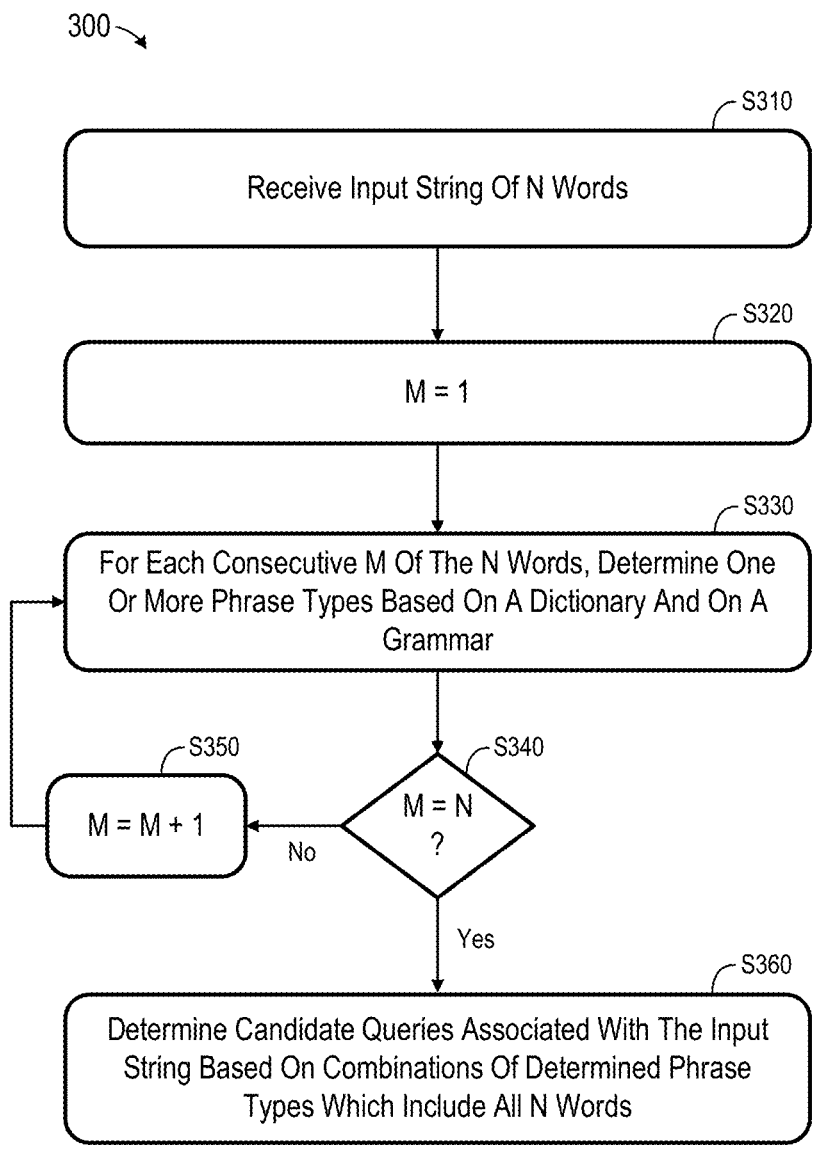
FIG. 3 is a flow diagram of a process to determine candidate queries according to some embodiments.

FIG. 3 comprises a flow diagram of process 300 according to some embodiments. Process 300 may be executed to determine a plurality of candidate queries based on an input text string. The number of candidate queries may facilitate subsequent processing and selection of a subset of queries therefrom.

In some embodiments, various hardware elements of system 100 execute program code to perform process 300. Process 300 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an input string including N words is received at S310. The input string may be input into a user interface displayed on a client device and received by a parser component at S310. For example, interface 200 of FIG. 2 may comprise a Web page displayed by a Web browser application executing on a client device. The Web page may be provided by a cloud-based or on-premise Web server. Interface 200 is not limited to Web-based formats. A user interface or data visualization as described herein may be rendered on a server or may be transmitted to a client as XML, HTML and JavaScript for rendering thereon.

For purposes of clarity in describing process 300, it will be assumed that a variable M is initialized to 1 at S320. Embodiments need not utilize such a variable.

At S330, one or more phrase matches are determined for each consecutive M (i.e., initially 1) of the N words of the input string. The input string may be filtered prior to S330 to remove (or to flag as ignored) "stopwords". Stopwords are words which have been previously identified as being unlikely to contain semantic meaning in the current context. "The" is an example of a common stopword.

The phrase matches may be determined with reference to a dictionary and a grammar. The dictionary may include entities, each of which is associated with an entity type such as a keyword, a dimension, a member, and a measure. For example, the dictionary may include an entity "North America" associated with the member entity type, indicating that "North America" is a member of the dimension Region. Similarly, the entity "Region" may be associated with the dimension entity type.

A grammar may specify a phrase type and conditions which must be present within a string in order for the string to be associated with the phrase type. Conditions may be based on an entity type identified via the dictionary as described above, on the presence of specific words, on combinations of entities and phrase types within the string, and on other scenarios.

The chart below defines a grammar according to some embodiments. Embodiments are not limited to the grammar defined by the chart.

| Structure Type | Conditions |
| --- | --- |
| Intent | "show", "compare", "list", "what", "who", "when", "which", "where" |
| Exclude | "exclude", "except" |
| Not | "not" |
| Drill | "drill" |
| AB | "all" |
| Out of Vocabulary | — |
| Conjunction | "and", "or", "," |
| By For | "by", "for", "per" |
| Determiner | "a", "an", "the", "any" |
| For In | "for", "in" |
| Of | "of" |
| To | "to" |
| On | "on" |
| Rank | 1. Any of "top", "bottom", "best", "worst"<br>2. Rank Cardinal |
| Sort | 1. Any of "lowest", "least", "highest", "smallest", "largest"<br>2. Sort Cardinal |
| Dimension | 1. if matched entity is dimension<br>2. Dimension C_Dimension<br>3. Determiner Dimension |
| Chart Hint | if word is one of any of the charting hints e.g. barchart, heatmap e.t.c. |
| As | "as" |
| As Chart | As Chart Hint |
| Measure | 1. if matched entity is measure<br>2. Dimension C_Measure<br>3. Determiner Measure<br>4. Member Measure |
| Currency | if matched entity is currency |
| Time | 1. if matched entity is a time entity<br>2. Dimension For Time<br>3. Dimension Time<br>4. Time C_Time<br>5. Time On Dimension |
| C_Time | Conjunction Time |
| On Dimension | On Dimension |
| Dimension For | Dimension By For |
| Member | 1. if matched entity is a dimension member<br>2. Dimension C_Member<br>3. Determiner Member<br>4. Dimension Of Member<br>5. Member Dimension |
| Exclude Member | Exclude Member |
| C_Member | Conjunction Member |
| C_Dimension | Conjunction Dimension |
| C_Measure | Conjunction Measure |
| Dimension Of | Dimension Of |
| By Dimension | By For Dimension |
| For Member | For In Member |
| Drill | By For All |
| Drill Member | Drill Member |
| Cube | 1. if matched entity is a cube<br>2. Cube C_Cube |
| C_Cube | Conjunction Cube |
| Describe | "describe" |
| Cube Selector | if any of "in", "within", "for", "using", "search", "selected" |
| Select Cube | Cube Selector Cube |
| Describe Cube | Describe Cube |

According to the chart, the Structure Type column specifies the phrase types which correspond to the conditions in the Conditions column. For example, during a first iteration of S330 (i.e., M=1), any of the words "show", "compare", "list", "what", "who", "when", "which", and "where" present in the input string will be determined as matching an Intent phrase type. Similarly, any of the words "by", "for" and "per" will be determined as matching a By For phrase type, and the words "and" and "or" will be determined as matching a Conjunction phrase type.

As mentioned above, some phrase matches are based on entity matches determined with reference to the dictionary. For example, if an input word has been determined as matching a Member entity, that word is also determined to match a Member phrase type. In this regard, the Member phrase type is associated with several conditions, and phrases consisting of one or more words which satisfy any one of the several conditions will be determined as corresponding to the Member phrase type.

S330 may comprise any suitable algorithms to match M input words with a list of entities within a dictionary or phrase conditions specified in a grammar, including algorithms which provide "fuzzy" matching of non-identical words and/or phrases. For example, the algorithm may provide a score associated with each of several entities for a given M input words, and S330 may include identifying those entities associated with a score that is greater than a threshold value.

At S340, it is determined whether the consecutive word length M is equal to the length of the input string. If not, flow proceeds to S350 to increment the consecutive word length and then returns to S330 to determine one or more phrase types for each group of M consecutive words. As will be described below, the determination of phrase types during an iteration of S330 may be based on the determination of phrase types during prior iterations.

FIG. 4 illustrates a first iteration of S330 according to some embodiments and with respect to the input string "What is Sales in North America". Each block below each word represents any phrase types determined for each word during S330 and is labeled based on its (row, col) coordinate pair. For example, array (1,3) associated with the word Sales may indicate a Measure phrase type, an Out of Vocabulary phrase type, and a Member phrase type.

FIG. 5 illustrates a second iteration at S330 (i.e., M=2) according to some embodiments. Each block (2, y) represents phrase types determined based on the phrase types specified in block (1, y) of its corresponding column and block (1, y+1) of an adjacent column, as well as based on any dictionary entities matching the words in positions y and y+1 of the input string. For example, the phrase types associated with block (2, 4) are determined based on any dictionary entities matching the string "for North" and on any conditions of the grammar which are satisfied by all combinations of the phrase types associated with blocks (1,4) and (1,5). In one example, block (1,4) is associated with a By For phrase type and a For In phrase type, and block (1,5) is associated with only an Out of Vocabulary phrase type. Block (2,4) is therefore associated with no phase types because "for North" is not a dictionary entity and because there are no conditions specified in the grammar which are satisfied by a combination of the By For and Out of Vocabulary phrase types or a combination of the For In and Out of Vocabulary phrase types.

FIG. 6 illustrates third through sixth iterations at S330 according to some embodiments. The row number of each block indicates the iteration in which it was determined. For example, block (3,1) indicates phrase types which correspond to grammar conditions satisfied by any one of all combinations of the phrase types of blocks (2,1) and (1,3). Block (3,1) also indicates phrase types which correspond to grammar conditions satisfied by any one of all combinations of the phrase types of blocks (1,1) and (2,2).

Block (3,4) indicates phrase types which correspond to grammar conditions satisfied by any one of all combinations of the phrase types of blocks (2,4) and (1,6) and of blocks (1,4) and (2,5). During a second iteration of S330, it is determined that the words "North America" correspond to a Member entity and therefore block (2,5) indicates a Member phrase type. As described above, block (1,4) indicates a By For phrase type and a For In phrase type. With reference to the example grammar, the combination of the For In and Member phrase types of blocks (1,4) and (2,5) satisfies a condition corresponding to a For Member phrase type. Accordingly, block (3,4) is associated with the For Member phrase type. Block (3,4) may also be associated with other phrase types.

The number of combinations to consider increases with each iteration. For example, block (4,2) is associated with the sub-string "is Sales for North" and therefore indicates phrase types which correspond to grammar conditions satisfied by any one of all combinations of the phrase types of blocks (3,2) (i.e., "is Sales for") and (1,5) (i.e., "North"), of blocks (2,2) (i.e., "is Sales") and (2,4) (i.e., "for North"), and of blocks (1,2) (i.e., "is") and (3,3) (i.e., "Sales for North").

As described above, flow proceeds to S360 after an iteration at S330 which considers all N consecutive words (e.g., block (6,1)). At this point of process 300, each block of FIG. 6 includes zero or more determined phrase types, with each phrase type spanning one or more words of the input string. At S360, candidate queries are determined based on the determined phrase types.

Figure 7:
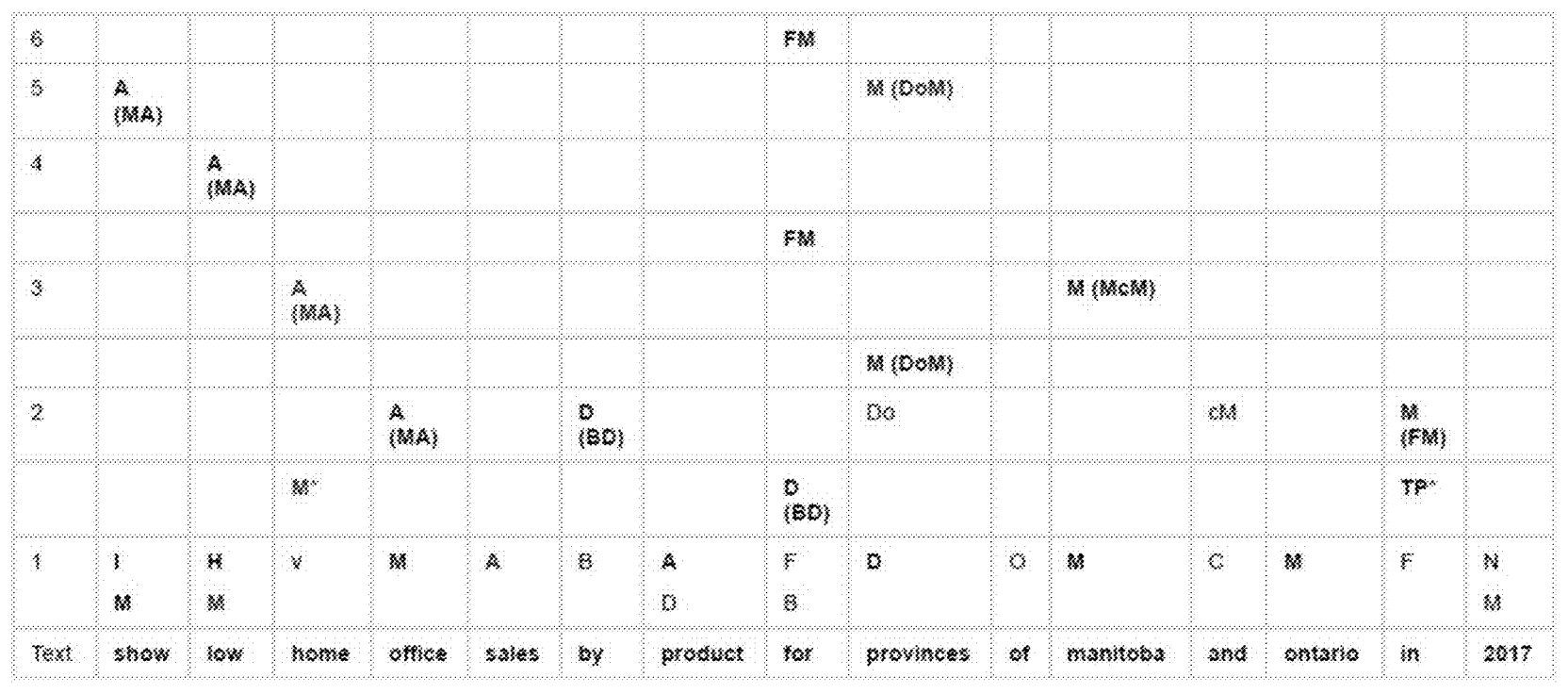

For purposes of describing an example of S360, FIG. 7 illustrates phrase matches determined prior to S360 for a given input string (i.e., "show low home office sales by product for the provinces of Manitoba and Ontario in 2017"). The chart of FIG. 7 is formatted differently from the charts of FIG. 4 through 6 in that the size of matched substrings increases from the bottom to the top of the FIG. 7 chart.

According to the illustrated example, the stop word "the" between "for" and "provinces" was been deleted prior to S330. Also, the token "home", taken alone, does not match a phrase type but does match a phrase type when considered within "home office". Such multi-word matches are illustrated at the level of the chart representing the size of the multiword match (i.e., "2" in the case of "home office") and are indicated with a "*". "home office" only matches as a full two-word Member while "office" is also matched as a one word Member.

"2017" matches a Member (i.e., "year") phrase type as well as a Number phrase type. "show" is matched as both keyword "show" (higher ranked) and "Tea shop" (member), and "low" matches both a keyword (i.e., as a stem of lowest) and the Member "low priority".

As shown in FIG. 7, the input string breaks up structurally into four parts (i.e., "show low home office sales", "by product", "for provinces of Manitoba and Ontario", "in 2017") that are independent of each other at the parsing level. That is, a five-token phrase beginning with the token "show" is indicated in the row of FIG. 7 labeled "5", this five-token phrase is followed by a two-token phrase beginning with the token "by" as shown in the row labeled "2", and this is followed by a six-token phrase beginning with the token "for" as shown in the row labeled "6". The last phrase is a two-token phrase beginning with the token "in" as shown in the row labeled "2". Accordingly, some embodiments facilitate the identification of "sub-phrases" within the input string.

Figure 8:
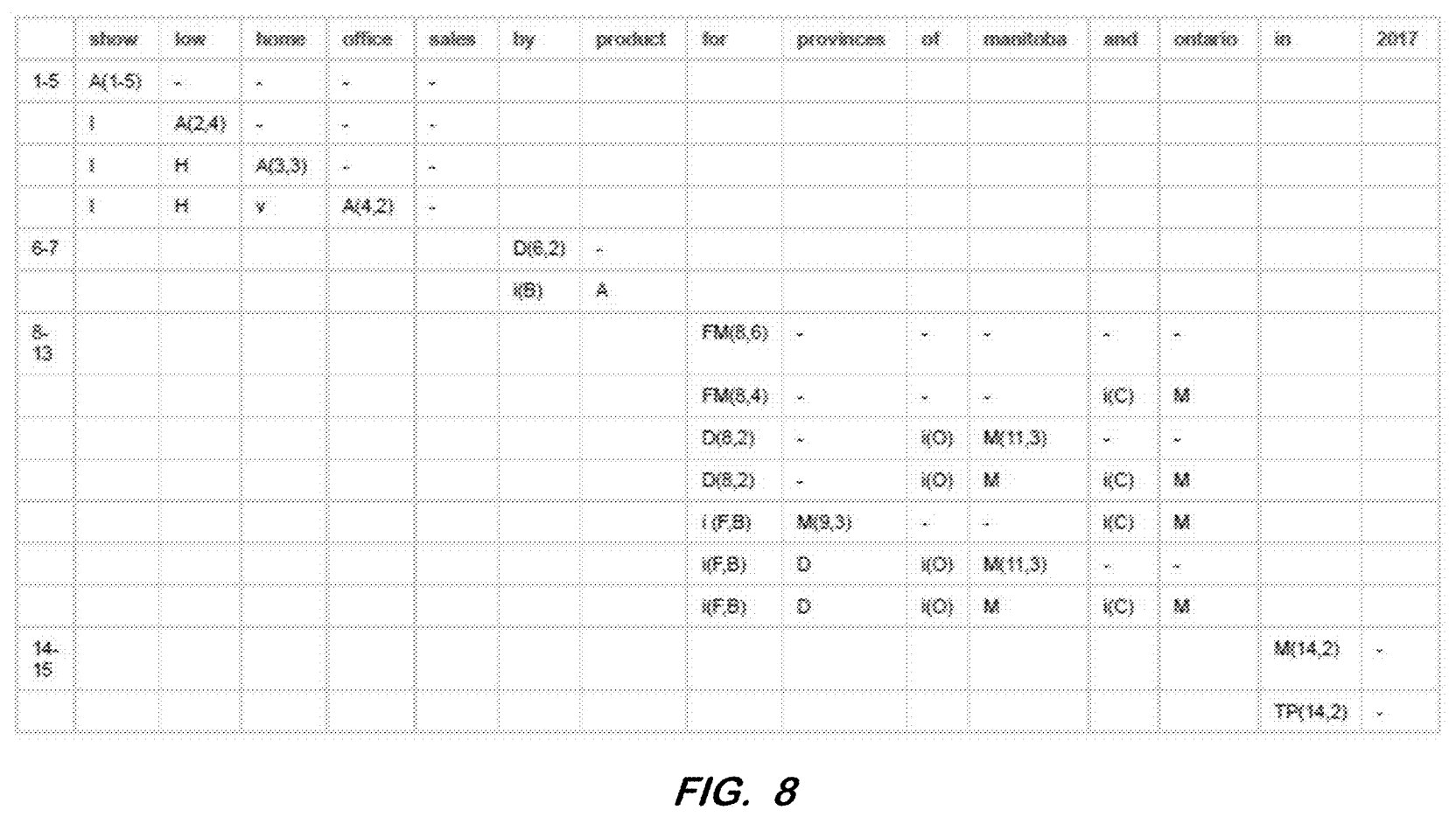

Each of these "sub-phrases" may be associated with several possible structural interpretations, and the possible options for each phrase are shown in the corresponding rows of the FIG. 8 chart. Breaks between sub-phrases may be identified by prepositions (by, for, in) which precede dimension list and filter clauses.

Sub-phrases that have no meaning unless completed (e.g., cM, cD, cA, Do) are omitted. Also, recognized tokens that mean nothing by themselves are converted to "ignored" i(X)

for X in: C, B, F, O, W, N. i(T) indicates terminal T has been ignored. In the present example of FIG. 8, the total number of structural interpretations (i.e., candidate queries) is 4 (for "show low home office sales")×2 (for "by product")×7 (for "for provinces of Manitoba and Ontario")×2 (for "in 2017")= 112.

A score is determined for each of the candidate queries in order to determine a smaller set of queries to present to the end-user such as that shown in interface 200. According to some embodiments, a score may be based on one or more of the following: a number of words in the input query which were fuzzy matched to entities in determining the phrase types of the candidate query; a number of words of the input query which were expanded to multi-word entities (e.g., "North America") during determination of the candidate query, a number of words of the input query which were ignored in determining the candidate query; a number of Intent, Dimension, Filtered, Measure, and Sort phrase types in the candidate query, and a number of conflicting Filters and Dimensions in the candidate query.

According to some embodiments, a score is determined for each structural interpretation of each sub-phrase, and the top-scoring interpretations of each sub-phrase are combined into candidate queries which are then in turn scored to determine a subset of top-scoring candidate queries. For example, if four sub-phrases are identified, and the top 10 scoring interpretations of each sub-phrase are considered, then 10×10×10×10=10000 candidate queries are scored to determine the candidate queries to present to the user.

Figure 10:
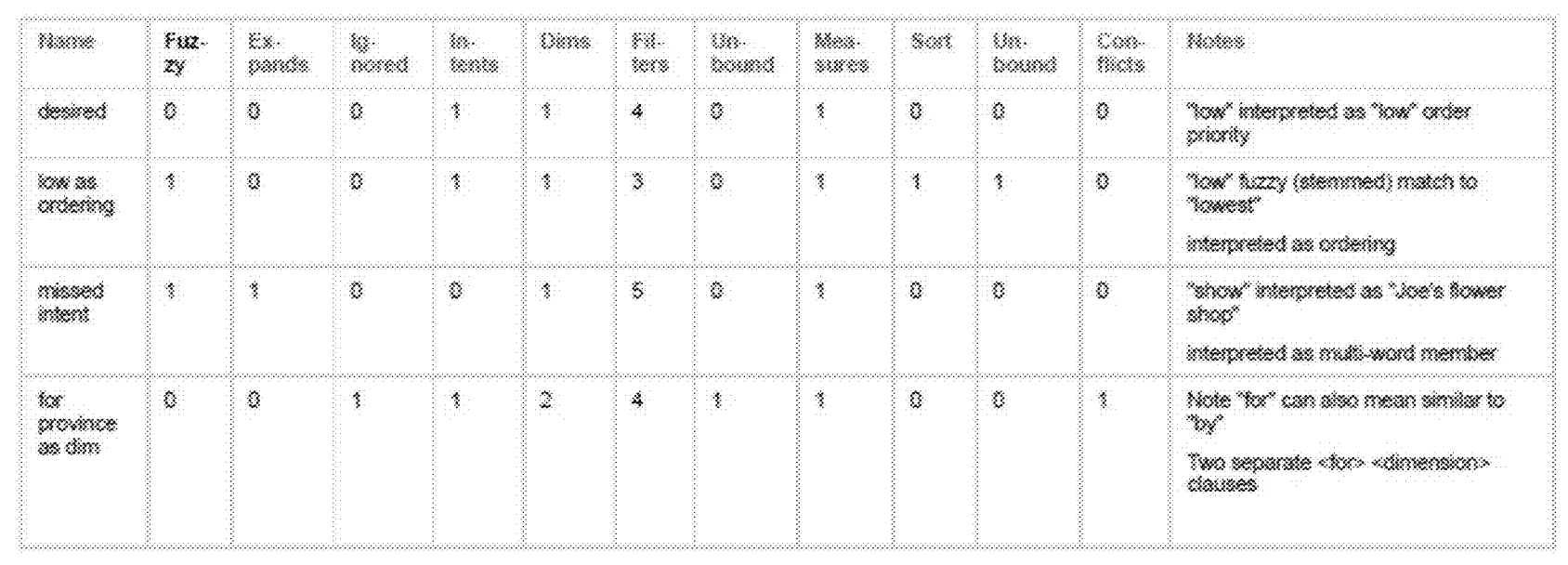

FIG. 9 illustrates a subset of the candidate queries of FIG. 8 for purposes of describing examples of scoring according to some embodiments. In this regard, each row of FIG. 10 represents an interpretation of the subset and the various drivers for scoring which are applicable to the interpretation.

For each interpretation, the columns Fuzzy, Expands, and Ignored specify the number of (non stop) words in the input string that were fuzzy-matched, expanded to multi-word entities, or ignored, respectively. The columns Intents (like show, display, . . . ), Dims (included in chart), Filters (dimensions filtered), Measures, and Sort (lowest/highest, top/bottom) specify the number of those items that exist in the interpretation.

The column Unbound represents the subset count of items (of the column immediately to the left) for which no "binding" text (typically prepositions or positioning just before a measure) was found. This characteristic typically applies to filters and sorting specifications. The column Conflicts represents the subset of Filters and Dimension specifications that are in logical conflict with each other.

Scoring may include generation of a score based on one or more sub-scores associated with various scoring features. For example, a score may be calculated as Score=$C_1$*log (GMNML)–$C_2$*FTNU+$C_3$*ICP, where GMNML=Geometric Mean of Normalized Match Likelihoods, FTNU=Fraction Tokens Not Used, ICP=Inverse Count of Phrases, and $C_1$, $C_2$ and $C_3$ are adjustable coefficients.

In some embodiments, GMNML is a measure of the average "quality" of the entity matches, with higher values indicating higher quality. The raw input will be Lucene scores for matching text to entities. Entities include Metadata entities from models and Keyword entities from the grammar. The Lucene scores are not normalized and fall in the range 0 . . . ~20.

GMNML scoring may normalize for the number of (non stop) words in the input text string, the number of those words consumed so far (if scoring partial interpretations), and should be in the range 0 . . . 1.

To normalize these scores (call e_i), each score is divided by the "highest" scoring match that overlaps with it (i.e., has at least one word in common): e_i,j=E_i,j/Max_(i',j' where b_i,j<=e_i',j' and e_i,j>=b_i',j') E_i',j'. Consequently, 0<=e_i,j<=1 for the score of each entity match. The GMNML score is defined as: GMNML(j)=Power(Product (i=1 . . . M) e_i,j, 1/M), where Power (x, 1/M) is the Mth root of x.

As each 0<=e_i,j<=1 then 0<=GMNML(j)<=1, thereby normalizing GMNML to remove the effect of the number of entity matches.

FTNU may measure how fully the interpretation uses the input string, with lower values being preferred. FTNU may be determined as a simple ratio of the tokens (words) in the input string that do not participate in any entity match (keyword or metadata) compared to the total number of tokens. For example, FTNU(j)=(Sum_(k=1 . . . N where there is no i for which b_i,j<=k<=e_i,j) 1)/N.

According to some embodiments, ICP measures how well the input string has been parsed into compound phrases supported by the grammar, with higher values reflecting better parsing. The ICP measure promotes interpretations with a low number of phrases as a result of coalescing words/phrases into larger phrases compatible with the grammar. Where N is the total number of phrases in the interpretation: ICP=(N_0+1)/(N_0+N) with N_0=5.

The FGBT score represents how well an interpretation can match keywords used in the text with the defined grammar, with higher values being better. FGBT is a measure (ratio to total words) of how well the (non stop) words in the input string are interpreted grammatically in a given interpretation. Each (non stop) word is assigned a value in the range [0.,1.] which represents how well it is grammatically bound. This per word measure depends on the type of entity to which the word is bound.

For example, Metadata entity words are assigned value 1 if they have been tagged with a compatible part of speech class (adjective, noun, verb or adverb), and otherwise 0. Keywords (in the grammar) are assigned value 1 if they are part of a multi word phrase, and 0 if they are not part of a phrase. Unmatched words are assigned the value 0 in the numerator, and Stop words (i.e., ignored words) are assigned the value 0 in the numerator and are not included in the denominator.

FGBT is defined as the ratio of the sum of all the per word assigned values above divided by the count of all (non stop) words.

Some embodiments may use any combination of scoring features that are or become known. Examples of such features, the values of which may be incorporated into an overall scoring equation in any suitable manner, include Per Token Match Likelihood (TML), Model Match Likelihood (MML), Product of all Match Likelihoods (PML), Fraction Tokens Not Used (FTNU), Model Content Usage Frequency (MCUF), and Query Structure Usage Frequency (QSUF).

Figure 11:
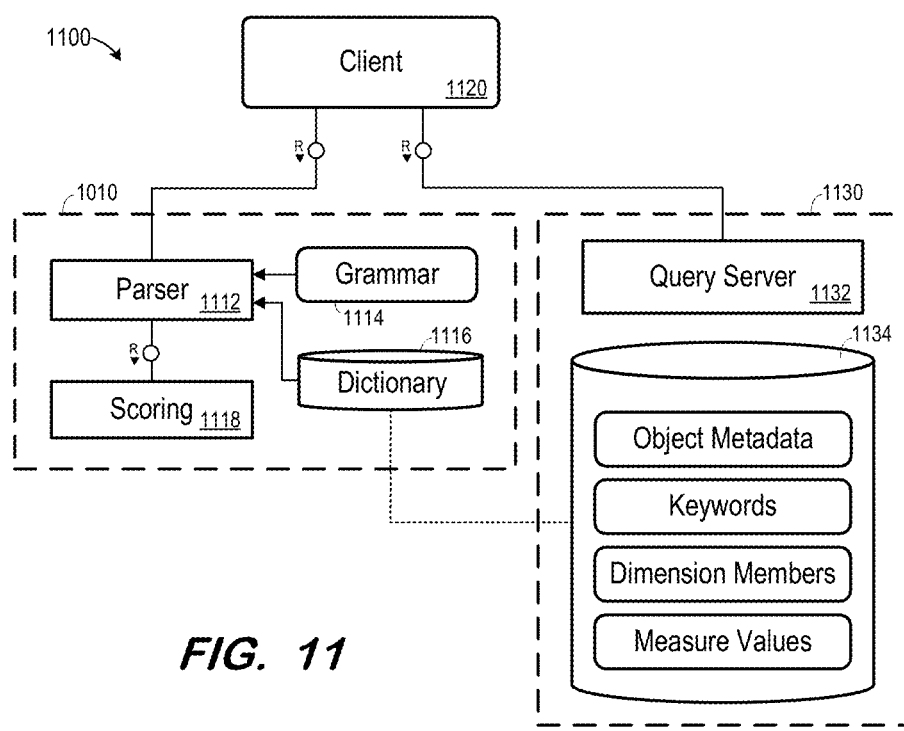
FIG. 11 is a block diagram of a system architecture according to some embodiments.

FIG. 11 illustrates architecture 1100 according to some embodiments. Architecture 1100 may comprise a system to query one or more data sources, and may implement process 300 according to some embodiments. Architecture 1100 may be implemented using any client-server architecture that is or becomes known, including but not limited to on-premise, cloud-based and hybrid architectures.

Architecture 1100 includes query interpreter 1110, client 1120 and data server 1130. Query interpreter 1110 may receive a text string from client 1120 and may return a list of top-scoring candidate queries as described above. Client 1120 may then present one or more of the received queries to query server 1130 to request associated result sets therefrom. In one specific example, query server application 1132 generates an SQL script based on a received query and forwards the SQL script to data store 1134. Data store 1134 executes the SQL script to return a result set based on data of data store 1134, and client 1120 generates and displays a report/visualization based on the result set.

Query server application 1132 may be separated from or closely integrated with data store 1134. Query server application 1132 may be executed completely on a database platform of data store 1134, without the need for an additional server. Query interpreter 1110 may also be executed on a same database platform in some embodiments.

Data store 1134 stores object metadata, keywords, dimension members and measure values. Generally, the object metadata defines data objects such as dimensions and measures, and the dimension members and measure values include data representing actual (i.e., instantiated) versions of those objects. As indicated by a dashed line, dictionary 1116 used by parser 1112 may leverage entities defined within data store 1134.

The data of data store 1134 may comprise one or more of conventional tabular data, row-based data, column-based data, and object-based data. Moreover, the data may be indexed and/or selectively replicated in an index to allow fast searching and retrieval thereof. Data store 1134 may support multi-tenancy to separately support multiple unrelated clients by providing multiple logical database systems which are programmatically isolated from one another.

Data store 1134 may comprise any query-responsive data source or sources that are or become known, including but not limited to a structured-query language (SQL) relational database management system. Data store 1134 may comprise a relational database, a multi-dimensional database, an eXtendable Markup Language (XML) document, or any other data storage system storing structured and/or unstructured data. The data of data store 1134 may be distributed among several relational databases, dimensional databases, and/or other data sources. Embodiments are not limited to any number or types of data sources.

Data store 1134 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 1120 may comprise one or more devices executing program code of an application for presenting user interfaces to allow interaction with interpreter 1110 and query server 1130. The user interfaces may be suited for reporting, data analysis, and/or any other functions based on the data of data store 1134.

Figure 12:
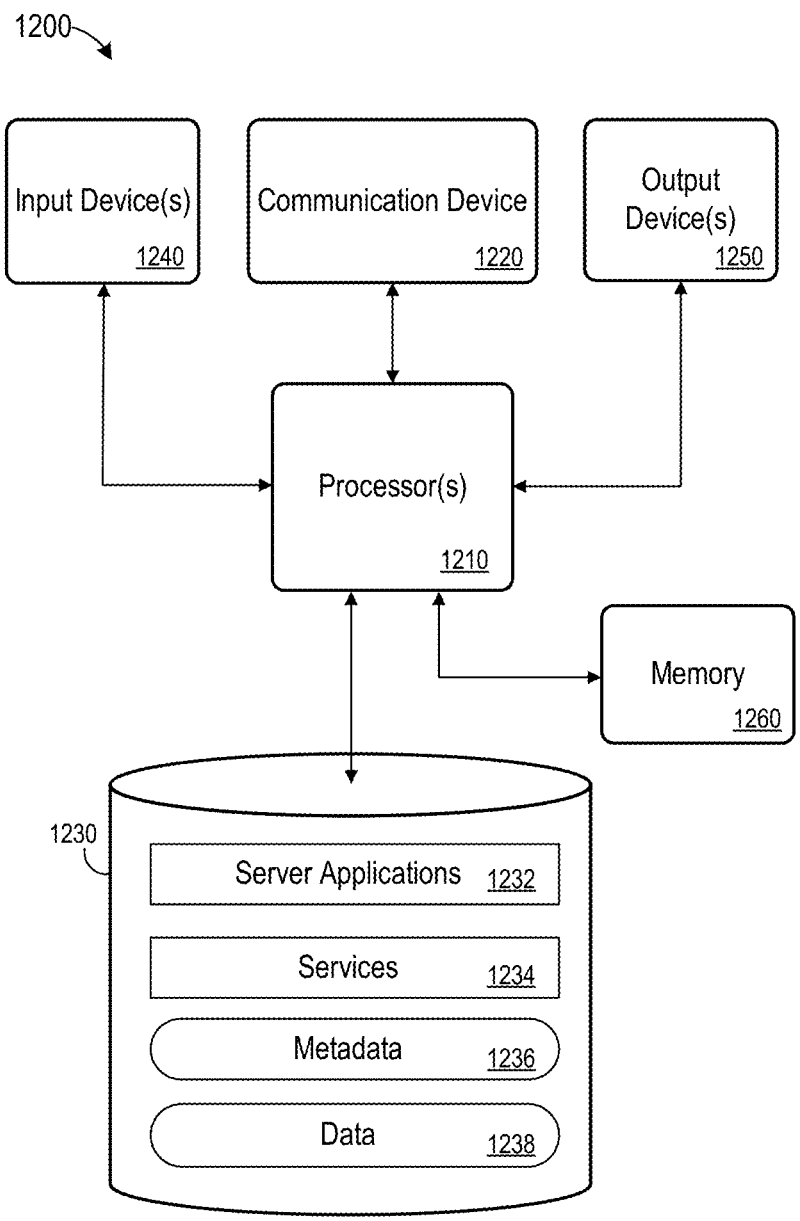
FIG. 12 is a block diagram of an apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of query interpreter 1110 in some embodiments. Apparatus 1200 may include other unshown elements according to some embodiments.

Apparatus 1200 includes processor(s) 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen), a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Server applications 1232 and services 1234 may comprise program code executed by processor 1210 to cause apparatus 1200 to perform any one or more of the processes described herein. Embodiments are not limited to execution of these processes by a single apparatus.

Metadata 1236 and data 1238 (either cached or a full database) may be stored in volatile memory such as memory 1260. Metadata 1236 may include information regarding keywords, dimensions, dimension values, measures associated with the data sources of data 1238. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
a dictionary describing a plurality of entities, each of the plurality of entities associated with an entity type;
a grammar describing a plurality of phrase types, each of the plurality of phrase types associated with one or more conditions;
a parser to:
receive an input string of X words;
initialize a counter N at a value of 1;
perform a first match of N individual words of the input string of X words with one or more entities defined in the dictionary to determine one or more first phrase types during a first iteration of two or more iterations;
performing the following until counter N has a value equal to X:
increment counter N,
perform an Nth match of a combination of N consecutive words of the input string of X words during an Nth iteration of the two or more iterations;
for each subset of N consecutive words in the input string during the Nth iteration, determine one or more Nth phrase types based on the subset, the Nth match, and the grammar, wherein a determination of the one or more Nth phrase types during the at least the Nth iteration is based at least partially on a determination of the one or more Nth phrase types during at least one prior iteration; and
determine a plurality of candidate queries based on the determined one or more first phrase types and the one or more Nth phrase types;
a scorer to score each of the plurality of candidate queries; and
a communication device to transmit one or more signals to an output device, the one or more signals comprising a subset of the plurality of candidate queries based on respective scores of the plurality of candidate queries.

2. A computing system according to claim 1, the scorer to further:
return Y of the plurality of candidate queries associated with the highest Y scores.

3. A computing system according to claim 1, the scorer to further:
return all of the plurality of candidate queries associated with a score above a predetermined threshold score.

4. A computing system according to claim 1, the scorer to further:
execute a candidate query associated with the highest score.

5. A computing system according to claim 1, wherein determination of one or more phrase types for each subset of consecutive one or more words in the input string comprises:
for each subset, determination of whether any groups of consecutive one or more words of the subset or combinations of groups of consecutive one or more words of the subset match a condition of a phrase type described in the grammar.

6. A computing system according to claim 5, wherein the determination of whether any groups of consecutive one or more words of the subset or combinations of groups of consecutive one or more words of the subset match a condition of a phrase type described in the grammar comprises:
determination of whether any groups of consecutive one or more words of the subset match an entity described in the dictionary.

7. A computer-implemented method comprising:
receiving an input string of X words;
initializing a counter N at a value of 1;
performing a first match of N individual words of the input string of X words with one or more entities defined in a dictionary to determine one or more first phrase types during a first iteration of two or more iterations;
performing the following until counter N has a value equal to X:
incrementing counter N,
performing an Nth match of a combination of N consecutive words of the input string of X words during an Nth iteration of the two or more iterations;
for each subset of N consecutive words in the input string during the Nth iteration, determining one or more Nth phrase types based on the subset, on the Nth match, and on a grammar describing a plurality of phrase types, each of the plurality of phrase types associated with one or more conditions, wherein a determination of the one or more Nth phrase types during the at least the Nth iteration is based at least partially on a determination of the one or more Nth phrase types during at least one prior iteration;
determining a plurality of candidate queries based on the determined one or more first phrase types and the one or more Nth phrase types;
scoring each of the plurality of candidate queries; and
transmitting one or more signals to an output device, the one or more signals comprising a subset of the plurality of candidate queries based on respective scores of the plurality of candidate queries.

8. A computer-implemented method according to claim 7, further comprising:
returning Y of the plurality of candidate queries associated with the highest Y scores.

9. A computer-implemented method according to claim 7, further comprising:
returning all of the plurality of candidate queries associated with a score above a predetermined threshold score.

10. A computer-implemented method according to claim 7, further comprising:
executing a candidate query associated with the highest score.

11. A computer-implemented method according to claim 7, wherein determining one or more phrase types for each subset of consecutive one or more words in the input string comprises:
for each subset, determining whether any groups of consecutive one or more words of the subset or combinations of groups of consecutive one or more words of the subset match a condition of a phrase type described in the grammar.

12. A computer-implemented method according to claim 11, wherein determining whether any groups of consecutive one or more words of the subset or combinations of groups of consecutive one or more words of the subset match a condition of a phrase type described in the grammar comprises:
determining whether any groups of consecutive one or more words of the subset match an entity described in the dictionary.

13. A computer-implemented system comprising:
a dictionary describing a plurality of entities, each of the plurality of entities associated with an entity type;
a grammar describing a plurality of phrase types, each of the plurality of phrase types associated with one or more conditions; and
a parser to:
receive an input string of X words;
initialize a counter N at a value of 1;
perform a first match of N individual words of the input string of X words with one or more entities defined in the dictionary to determine one or more first phrase types during a first iteration of two or more iterations;
perform the following until counter N has a value equal to X:
increment counter N,
perform an Nth match of a combination of N consecutive words of the input string of X words during an Nth iteration of the two or more iterations;
for each subset of N consecutive words in the input string during the Nth iteration, determine one or more Nth phrase types based on the subset, the Nth match, and the grammar, wherein a determination of the one or more Nth phrase types during the at least the Nth iteration is based at least partially on a determination of the one or more Nth phrase types during at least one prior iteration; and
determine a plurality of candidate queries based on the determined one or more first phrase types and the one or more Nth phrase types;
a scorer to score each of the plurality of candidate queries; and
a communication device to transmit one or more signals to an output device, the one or more signals comprising a subset of the plurality of candidate queries based on respective scores of the plurality of candidate queries.

14. A computer-implemented system according to claim 13, wherein the parser is further configured to return Y of the plurality of candidate queries associated with the highest Y scores.

15. A computer-implemented system according to claim 13, wherein the parser is further configured to return all of the plurality of candidate queries associated with a score above a predetermined threshold score.

16. A computer-implemented system according to claim 13, wherein determination of one or more phrase types for each subset of consecutive one or more words in the input string comprises:
for each subset, determination of whether any groups of consecutive one or more words of the subset or combinations of groups of consecutive one or more words of the subset match a condition of a phrase type described in the grammar.

17. A computer-implemented system according to claim 16, wherein determination of whether any groups of consecutive one or more words of the subset or combinations of groups of consecutive one or more words of the subset match a condition of a phrase type described in the grammar comprises:
determination of whether any groups of consecutive one or more words of the subset match an entity described in the dictionary.

* * * * *